United States Patent Office 3,309,169
Patented Mar. 14, 1967

3,309,169
PEROVSKITES
Gerhard Bayer, Hinteregg, Zurich, Switzerland, assignor to Owens-Illinois, Inc., a corporation of Ohio
No Drawing. Continuation of applications Ser. No. 278,486 and Ser. No. 278,487, May 6, 1963. This application Oct. 25, 1966, Ser. No. 589,229
8 Claims. (Cl. 23—50)

This application is a continuation of my copending applications Ser. No. 278,486 filed May 6, 1963, and Ser. No. 278,487 filed May 6, 1963, both now abandoned.

This invention relates to new crystalline compounds containing hexavalent tellurium and having a perovskite crystalline structure.

I have discovered that hexavalent tellurium can exist in crystalline compounds in 6-fold coordination. More specifically, I have now discovered new dielectric perovskite type crystalline compounds wherein hexavalent tellurium has 6-fold coordination, which can be generally described as having the formula:

$$A^{2+}A^{3+}A^{1+}Te^{6+}O_6$$

wherein $A^{2+}A^{3+}$ and $A^{1+}$ are metals of valence two, three and one respectively.

Within the broad class defined by the formula $A^{2+}A^{3+}A^{1+}Te^{6+}O_6$ are two subclasses of perovskites. These are compounds of the formula $$B^{2+}B^{3+}B^{1+}Te^{6+}O_6$$

where $B^{2+}$ is selected from the group consisting of $Ca^{2+}$, $Sr^{2+}$, $Ba^{2+}$, and $Pb^{2+}$, $B^{3+}$ is selected from the group consisting of $Bi^{3+}$ and $La^{3+}$, and $B^{1+}$ is selected from the group consisting of $Li^{1+}$ and $Na^{1+}$, with the provision that when the $B^{3+}$ ion is $Bi^{3+}$, the $Ca^{2+}$ ion is not selected; and compounds of the formula $$C^{1+}C^{3+}C^{2+}Te^{6+}O_6$$

wherein $C^{1+}$ is selected from the group consisting of $Na^{1+}$, $K^{1+}$ and $Rb^{1+}$; $C^{3+}$ is selected from the group consisting of $Bi^{3+}$ and $La^{3+}$; and $C^{2+}$ is selected from the group consisting of $Mg^{2+}$, $Ni^{2+}$, $Co^{2+}$, $Cu^{2+}$, $Zn^{2+}$, $Cd^{2+}$ and $Ca^{2+}$; with the provision that when $Bi^{3+}$ is selected, $Na^{1+}$ is not selected.

My new perovskites are dielectric materials useful where materials having relatively high dielectric constants are commonly used. Also, many of my new perovskites are ferroelectric.

Specific examples of perovskites of the formula $B^{2+}B^{3+}B^{1+}Te^{6+}O_6$ are $CaLaLiTeO_6$, $SrLaLiTeO_6$, $CaLaNaTeO_6$, $BaBiNaTeO_6$, $SrBiLiTeO_6$, $BaLaLiTeO_6$, $BaBiLiTeO_6$, $BaLaNaTeO_6$, $SrLaNaTeO_6$, $PbBiLiTeO_6$, $PbLaLiTeO_6$, $PbBiNaTeO_6$, $SrBiNaTeO_6$ and $PbLaNaTeO_6$ Specific examples of perovskites of the formula $C^{1+}C^{3+}C^{2+}Te^{6+}O_6$ are $RbBiMgTeO_6$, $NaLaMgTeO_6$, $KLaMgTeO_6$, $KBiCaTeO_6$, $NaLaZnTeO_6$, $RbLaCuTeO_6$, $NaLaNiTeO_6$, $KLaCaTeO_6$.

The compounds of the invention can be prepared by mixing equimolar proportions of the $B^{2+}$ oxide, the $B^{3+}$ oxide, the $B^{1+}$ oxide and $TeO_2$ or the $C^{2+}$ oxide, $C^{3+}$ oxide, $C^{1+}$ oxide and $TeO_2$ in finely divided form. The powders, as stated, are intimately admixed, pressed to a cohesive shape, and then fired in an oxidizing (air) atmosphere by heating slowly up to 700° C. where they are held for about 4 to 6 hours. In the case of strontium and barium I have actually used carbonates and nitrates instead of the oxides. Also, such salts can be used in the case of the other ions. During the firing up to 700° C. and holding at this temperature, most of the $TeO_2$ is oxidized to the hexavalent state and nitrates are decomposed; also some decomposition of carbonates takes place. Thereafter, the temperature is slowly raised to 880° C. in the case of the lead-containing materials and held there for 20 hours or to 1050° C. in the case of the other materials and held there for 20 hours, and then cooled. Although not absolutely necessary, in the actual work done by me, the compositions were cooled to room temperatures following the 700° C. heat treatment and were reground and then thoroughly mixed with the additions of acetone, and again pressed to a cohesive form prior to the final heat treatment just described.

The following examples will point out, by way of illustration only, the preparation of representative compounds within the scope of this invention.

Example I

The compound $BaLaLiTeO_6$, representative of compounds of the formula $B^{2+}B^{3+}B^{1+}Te^{6+}O_6$, was prepared by mixing equimolar proportions of $Ba_2CO_3$, $La_2O_3$, $LiOH$ and $TeO_2$, all having a particle size of less than 20 mesh. The powders were very intimately admixed and then pressed into disks of 20 mm. in diameter, using 2–3 grams of the fine powders. Thereafter they were fired slowly up to 700° C. and held there for about 4–6 hours. They were then cooled to room temperature, reground, again thoroughly mixed with the addition of acetone, and pressed into disks and then slowly heated up to 1050° C. where they were held for 20 hours before cooling to room temperature. X-ray powder diffraction data was obtained on the compound, and the cubic perovskite compound had a lattice constant of 8.03 Angstrom units. The product was white and showed no detectable deviation from cubic symmetry.

Some of the other compounds of the formula $$B^{2+}B^{3+}B^{1+}Te^{6+}O_6$$

prepared in the manner described above showed a slight deviation from cubic symmetry, but assuming cubic symmetry, the lattice constant of $CaLaLiTeO_6$ was 7.88, the lattice constant of $PbLaLiTeO_6$ was 7.96 and the lattice constant of $PbBiLiTeO_6$ was 8.06.

Example II

The compound $KLaMgTeO_6$, representative of compounds of the formula $C^{1+}C^{3+}C^{2+}Te^{6+}O_6$, was prepared by mixing equimolar proportions of $K_2O$, $La_2O_3$, $MgO$ and $TeO_2$, all having a particle size of less than 20 mesh. The powders were very intimately admixed and then pressed into disks of 20 mm. in diameter, using 2–3 grams of the fine powders. Thereafter the disks were fired slowly up to 700° C. and held there for about 4–6 hours. They were then cooled to room temperature, reground, again thoroughly mixed with the addition of acetone, and pressed into disks and then slowly heated up to 1050° C. where they were held for 20 hours before cooling to room temperature. X-ray powder diffraction data was obtained on the compound, and the cubic perovskite compound had a lattice constant of 7.93 Angstrom units. The product was white and showed only slight deviation from cubic symmetry.

Some of the other compounds of the formula $$C^{1+}C^{3+}C^{2+}Te^{6+}O_6$$

prepared in the manner described above also showed a slight deviation from cubic symmetry, but assuming cubic symmetry, the lattice constant of $NaLaMgTeO_6$, for instance, was 7.86. In the following table are given complete X-ray powder diffraction data for these two representative crystalline perovskites of the invention:

TABLE

| mkl | KLaMgTeO$_6$ | | NaLaMgTeO | |
|---|---|---|---|---|
| | d | I | d | I |
| 100 | 7.95 | mw | 7.90 | w |
| 111 | 4.58 | m | 4.53 | m |
| 200 | 3.97 | vw | 3.93 | vw |
| 210 | 3.53 | vw | 3.50 | w |
| 220 | 2.80 | s | 2.78 | s |
| 311 | 2.39 | m | 2.37 | m |
| 222 | 2.29 | mw | 2.27 | mw |
| 400 | 1.982 | ms | 1.964 | ms |
| 331 | 1.815 | w | 1.802 | w |
| 422 | 1.618 | ms | 1.605 | s |
| 333 | 1.528 | w | 1.515 | w |
| 440 | 1.40 | m | 1.388 | m |
| 531 | 1.347 | w | 1.328 | w |
| 620 | 1.256 | mw | 1.243 | mw |

It happens that, in addition to their dielectric properties, the compounds of the invention are all white or colored pigments of very good coloring covering power when finely divided. They can be employed as pigments in ceramic glazes, enamels, paints and dyes. They are also useful as pigments in plastics and can be incorporated therein as powders in such plastics as polyethylene or polystyrene, in amounts from 0.5 to 10 weight percent, or even higher, where desired.

Most of the compounds of the invention can form solid solutions with other compounds of the invention and in many cases with other perovskites of the type ABO$_3$.

As will be evident to those skilled in the art, various modifications of this invention can be made or followed in the light of the foregoing disclosure and discussion, without departing from the spirit and scope of the disclosure or from the scope of the claims.

I claim:

1. A new perovskite type crystalline compound of the formula $$B^{2+}B^{3+}B^{1+}Te^{6+}O_6$$

where $B^{2+}$ is selected from the group consisting of $Ca^{2+}$, $Sr^{2+}$, $Ba^{2+}$, and $Pb^{2+}$; $B^{3+}$ is selected from the group consisting of $Bi^{3+}$ and $La^{3+}$; and $B^{1+}$ is selected from the group consisting of $Li^{1+}$ and $Na^{1+}$; with the provision that $Ca^{2+}$ is not selected when $Bi^{3+}$ is selected.

2. The perovskite crystalline compound as defined in claim 1 having the formula CaLaLiTeO$_6$.

3. The perovskite crystalline compound as defined in claim 1 having the formula PbLaLiTeO$_6$.

4. The perovskite crystalline compound as defined in claim 1 having the formula BaLaLiTeO$_6$.

5. The perovskite crystalline compound as defined in claim 1 having the formula PbBiLiTeO$_6$.

6. A new perovskite type crystalline compound of the formula $$C^{1+}C^{3+}C^{2+}Te^{6+}O_6$$

where $C^{1+}$ is selected from the group consisting of $Na^{1+}$, $K^{1+}$ and $Rb^{1+}$; $C^{3+}$ is selected from the group consisting of $Bi^{3+}$ and $La^{3+}$; and $C^{2+}$ is selected from the group consisting of $Mg^{2+}$, $Ni^{2+}$, $Co^{2+}$, $Cu^{2+}$, $Zn^{2+}$, $Cd^{2+}$ and $Ca^{2+}$; with the proviso that $Na^{1+}$ is not selected when $Bi^{3+}$ is selected.

7. The crystalline perovskite compound as defined in claim 6 having the formula NaLaMgTeO$_6$.

8. The crystalline perovskite compound as defined in claim 6 having the formula KLaMgTeO$_6$.

References Cited by the Examiner

UNITED STATES PATENTS

| 2,691,738 | 10/1954 | Mathias | 23—51 X |
| 3,022,186 | 2/1962 | Hund | 106—288 X |
| 3,034,857 | 5/1962 | Brixnes | 23—51 |
| 3,035,896 | 5/1962 | Brixnes | 23—51 |

OTHER REFERENCES

Bayer: "Journal of the American Ceramic Society," vol. 46, No. 12, December 1963, pages 604–605.

Wold et al.: "Journal of the American Chemical Society," vol. 76, No. 4, February 1954, pages 1029 and 1030.

OSCAR R. VERTIZ, *Primary Examiner.*

H. T. CARTER, *Assistant Examiner.*